US011943844B2

(12) United States Patent
Nelson et al.

(10) Patent No.: US 11,943,844 B2
(45) Date of Patent: Mar. 26, 2024

(54) MODULAR FLUID HEATER UTILIZING ELECTROTHERMAL POLYMER COATINGS

(71) Applicant: HUMBAY, INC., Kirkland, WA (US)

(72) Inventors: Robert C. Nelson, Woodinville, WA (US); John H. Laakso, Normandy Park, WA (US); Andrew Jackson Hedgcock, IV, Kirkland, WA (US); Michael D. Ross, Mercer Island, WA (US)

(73) Assignee: HUMBAY, INC., Kirkland, WA (US)

( * ) Notice: Subject to any disclaimer, the term of this patent is extended or adjusted under 35 U.S.C. 154(b) by 380 days.

(21) Appl. No.: 17/193,448

(22) Filed: Mar. 5, 2021

(65) Prior Publication Data

US 2021/0282231 A1 Sep. 9, 2021

Related U.S. Application Data

(60) Provisional application No. 62/986,533, filed on Mar. 6, 2020.

(51) Int. Cl.
*H05B 1/02* (2006.01)
*H05B 3/14* (2006.01)
*H05B 3/48* (2006.01)

(52) U.S. Cl.
CPC ........... *H05B 1/0297* (2013.01); *H05B 3/146* (2013.01); *H05B 3/48* (2013.01)

(58) Field of Classification Search
CPC H05B 1/0297; H05B 1/0291; H05B 2214/04; H05B 3/146; H05B 3/48; H05B 3/18; H05B 3/28; H05B 3/46
USPC .................................................. 392/478, 503
See application file for complete search history.

(56) References Cited

U.S. PATENT DOCUMENTS

| | | | | |
|---|---|---|---|---|
| 4,429,213 | A * | 1/1984 | Mathieu | F24H 1/142 428/920 |
| 5,469,915 | A * | 11/1995 | Cesaroni | B29C 66/24221 165/76 |
| 8,038,479 | B2 | 10/2011 | Searfass | |
| 8,225,704 | B2 | 7/2012 | Ogrin et al. | |
| 8,837,925 | B2 * | 9/2014 | Lee | H05B 3/145 392/468 |
| 9,273,398 | B2 | 3/2016 | Gallaway et al. | |

(Continued)

FOREIGN PATENT DOCUMENTS

WO 2012/046031 A1 4/2012

*Primary Examiner* — Dana Ross
*Assistant Examiner* — Joe E Mills, Jr.
(74) *Attorney, Agent, or Firm* — CHRISTENSEN O'CONNOR JOHNSON KINDNESS PLLC

(57) ABSTRACT

A fluid heating element includes first and second conduits. The first conduit has a first inlet and a first outlet. The first inlet is configured to receive a first portion of the fluid, and the first outlet is configured to discharge the first portion of the fluid. The second conduit has a second inlet and a second outlet. The second inlet is configured to receive a second portion of the fluid, and the second outlet is configured to discharge the second portion of the fluid. The fluid heating element further includes an electrothermal coating associated with the first and second conduits and an electrical lead configured to apply an electric current across the electrothermal coating. The electrothermal coating converts the electric current to heat that is transferred to through the first and second conduits to the fluid.

15 Claims, 12 Drawing Sheets

(56) References Cited

U.S. PATENT DOCUMENTS

| | | | |
|---|---|---|---|
| 9,815,557 | B2 | 11/2017 | Nelson et al. |
| 2011/0177322 | A1 | 7/2011 | Ogrin et al. |
| 2012/0082806 | A1 | 4/2012 | Kissell et al. |
| 2015/0041326 | A1 | 2/2015 | Buckner et al. |
| 2015/0293065 | A1 | 10/2015 | Kissell et al. |

* cited by examiner

MODULAR FLUID HEATER UTILIZING ELECTROTHERMAL POLYMER COATINGS

CROSS-REFERENCE TO RELATED APPLICATION

This application claims the benefit of U.S. Provisional Patent Application No. 62/986553, filed Mar. 6, 2020, which is incorporated herein by reference in its entirety.

BACKGROUND

Heat exchangers are used in a variety of situations to transfer heat to a working fluid, i.e., to elevate the temperature of the working fluid. In many circumstances it is advantageous for these heat exchangers (heaters) to be compact and lightweight. It is also advantageous to provide a durable heater that can operate safely in different environments. Existing systems heat working fluids by heating the surface of heat exchanger parts through which the working fluids flow.

Known methods of heating the surface of the heat exchanger parts include applying high-temperature heat-generating metals (e.g., NiChrome) wire or foil to the heat exchanger parts and/or applying elastomeric (e.g., silicone rubber) heating pads with embedded NiChrome resistance-heating wires to those parts. However, these applications present different disadvantages. For example, elastomeric pads with heating wires will completely fail to heat if there is a break and/or burnout of the wire anywhere in the pad. Further, NiChrome wires and foil typically are operated at very high temperatures (up to glowing "white-hot" temperature) and need to be insulated with ceramic materials. Repeated heating and cooling will eventually induce thermal stress and strain leading to cracking and failure.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the presently disclosed subject matter provide compact assemblies of heat exchanger tubes or integral panels, utilizing electro-thermal polymer coatings, to form a lightweight fluid heaters. Lightweight and construction simplicity is made possible by the use of heat-generating electro-thermal polymer coating applied to each side of modular panels that are used singularly or stacked (laminated) to make a pile. Various additives (e.g., carbon black, graphene, carbon nanotubes, carbon fibrils, carbon fibers, metal particles, etc.) are incorporated in the coating to provide high-resistance conductivity resulting in heat generation.

Figure 1:
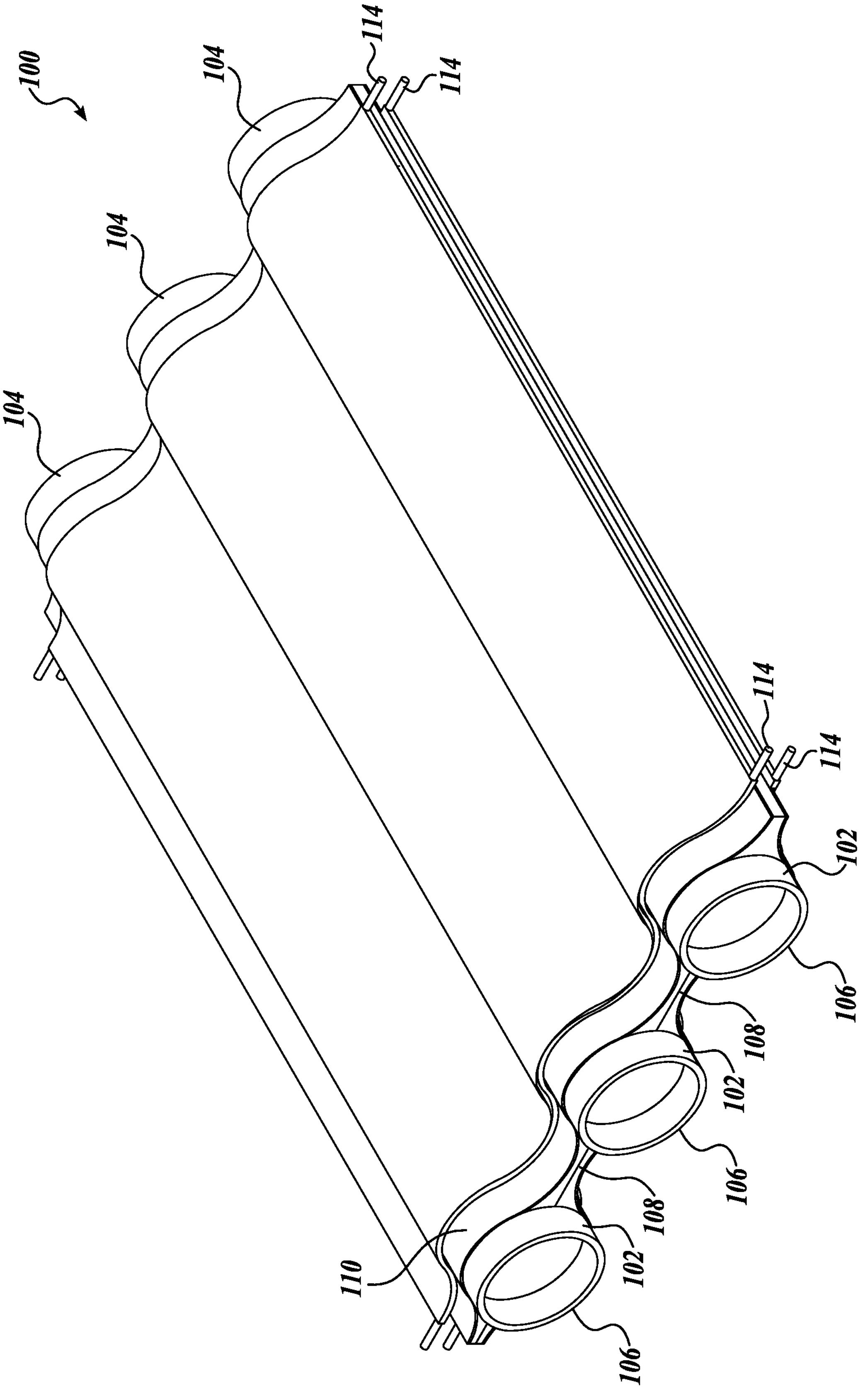
FIG. 1 shows an isometric view of a first representative embodiment of a modular fluid heater element.

FIG. 1 shows a first representative embodiment of a modular fluid heater element 100 according to the present disclosure. The heater element 100 includes a plurality of conduits 102, each conduit having an inlet 104 configured to receive a flow of fluid to be heated and an outlet 104 configured to discharge the heated fluid. The conduits 102 are made from a material with a high thermal conductivity to facilitate heat transfer through the conduits into the fluid passing therethrough. In some embodiments, the conduits are formed from 1100 aluminum alloy, however, any suitable material or combination of materials having sufficient heat transfer properties can be used.

In some embodiment a fin 108 comprises a web that extends between one or more pairs of adjacent conduits 102. The fins 108 may be integrally formed with the conduits 102, as shown in FIG. 1, or may be discrete components coupled to the conduits 102 by welding, brazing, mechanical fasteners, adhesives, or any suitable manufacturing process. In illustrated embodiment, the conduits are cylindrical tubes, however, as will be discussed in further detail, any suitable cross-sectional profile may be used. The fins 108 may be formed of the same material as the conduits 102 or from different materials that the conduits. In some embodiments, the conduits 102 and fins 108 are integrally formed as a single extrusion.

Still referring to FIG. 1, the conduits 102 and fins 108 are covered with an electrical insulation layer 110 comprising electrical insulator with a high thermal conductivity, e.g., an epoxy or silicone coating or a porcelain (ceramic) enamel. An electrothermal coating 112 is applied to the electrical insulation layer 110.

The electrothermal coating 112 generates heat in response to an applied electrical current. In one embodiment, the electrothermal coating 112 consists of high-temperature resistive polymeric insulation coatings encasing a polymer infused with conductive particles (e.g., carbon black, graphene, carbon nanotubes, carbon fibrils, carbon fibers, metal particles, etc.). One exemplary material suitable for use as the electrothermal coating 112 is manufactured by NanoRidge Materials, Inc., of Houston, Texas. The thickness of the electrothermal coating 112 can be uniform or varied depending on the panel configuration, design requirements and heater application. In some embodiments electrothermal coating 112 is applied by a spray-on method or a roll-on method.

Electrical leads 114 are electrically connected to the electrothermal coating 112 and are configured to supply an electric current to the electrothermal coating. In some embodiments, the electrical leads 114 are placed on the electrical insulation layer 110 before the electrothermal coating 112 is applied. In some embodiments, a conductive material, such as copper foil, is attached to any part of the heater element 100 to be electrically connected to the electrothermal coating.

In operation, fluid to be heated passes through the conduits 102 of the heater element 100. An electric current, which can be either AC or DC, is applied across the heater element 100 via the electrical leads 114. The electrothermal coating 112 generates heat in response to the electric current. The electrical insulation 110 isolates the conduits 102 from the electrical charge. The heat generated by the electrothermal coating 112 is transferred by conduction through the electrical insulation 110 and the conduits 102 to heat the fluids passing through the conduits.

Figure 2:
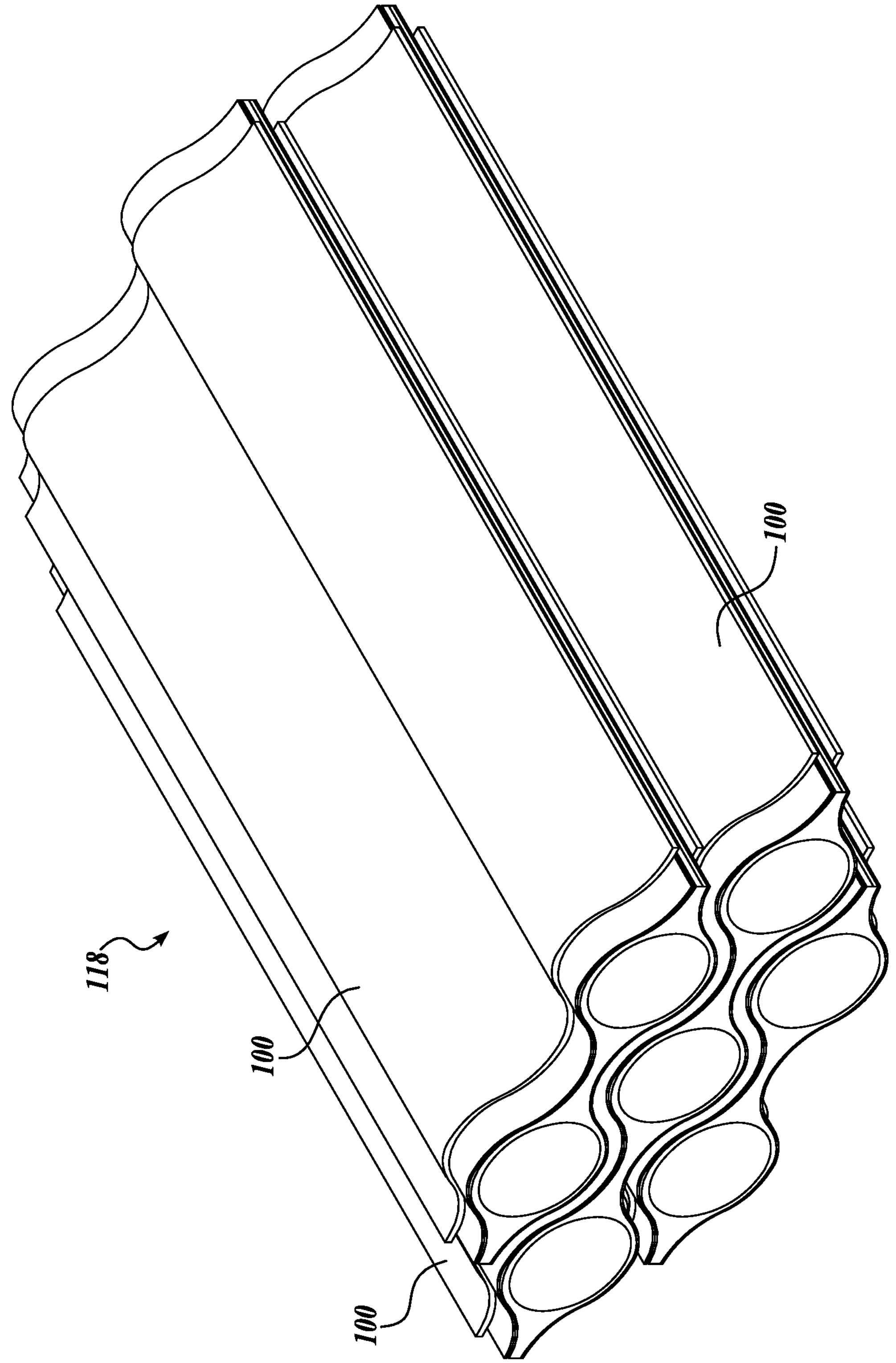
FIG. 2 shows an isometric view of a heater comprising a plurality of modular fluid heater elements as shown in FIG. 1.

The illustrated heater element 100 can be used in a variety of different configurations to provide a compact, lightweight, and efficient heater. As shown in FIG. 2, the heater element 100 configuration allows multiple heater elements to be stacked into a pile 118 in order to provide higher heating capacity. The channels 102 of each heater element 100 are arranged such that channels of one heater element in the stack nest between the channels of an adjacent heater element. As a result, the overall thickness of a stack of a number N of heater elements 100 is less than the sum of the thicknesses of N heater elements. Further, the nested configuration of the heater elements 100 reduces heat loss through convection, which results in a more efficient heater assembly 180.

While FIG. 2 shows a heater assembly 180 that includes 3 similar heater elements 100, it will be appreciate that the number of heater elements and the configuration of individual heater elements may vary within the scope of the present disclosure. In this regard, a single heater element 100 or any suitable number of heater elements 100 may be included in a heater assembly to accommodate the size, heating requirements, and/or power requirements for a given application. Further, some embodiments of a heater assembly 180 may include a combination of heater elements 100 that have different numbers, sizes and spacings of conduits 102. In some embodiments, the heater elements 102 include integral fins 108, while other heater elements include discrete fins. These and other variations are contemplated and should be considered within the scope of the present disclosure.

Figure 3:
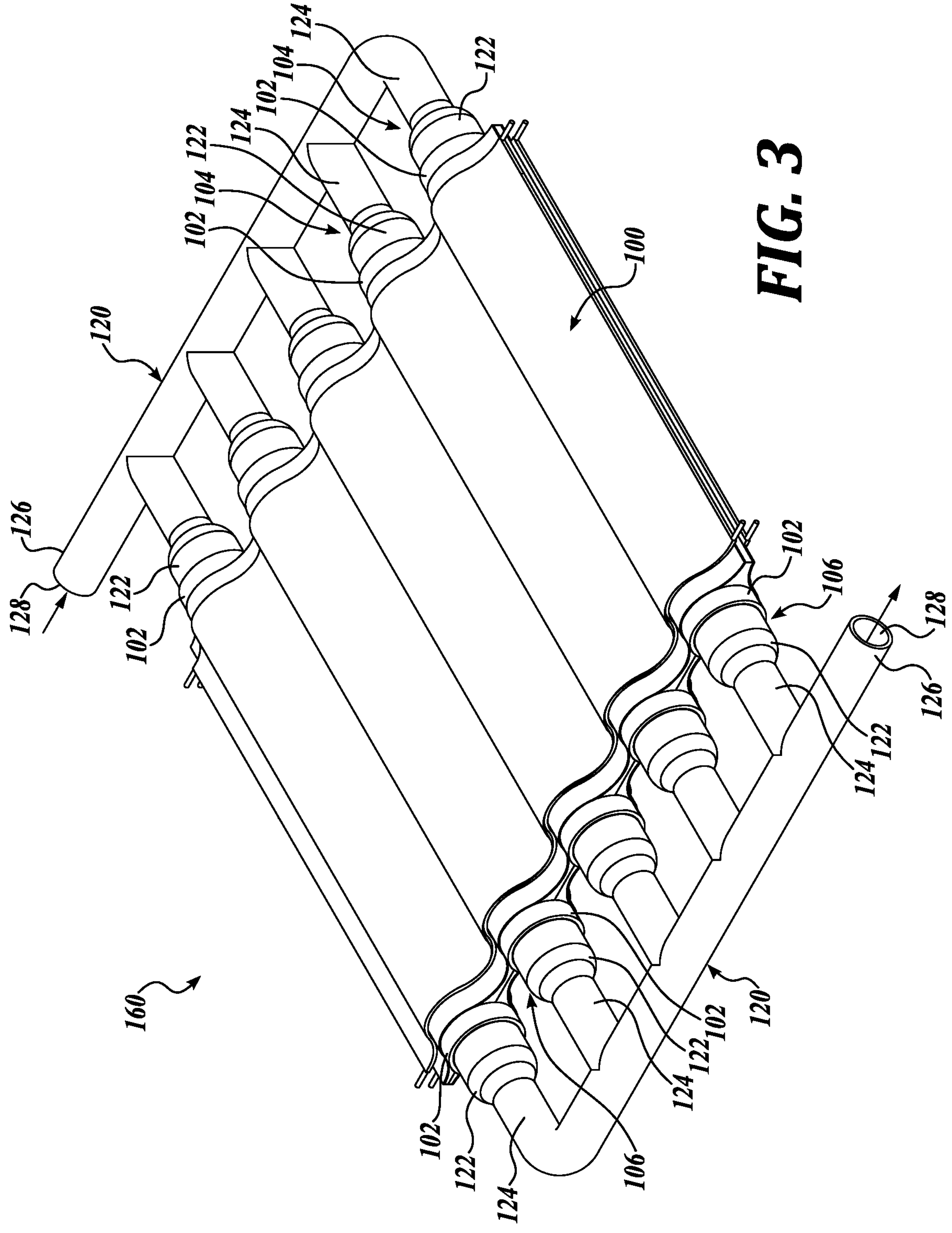
FIG. 3 shows an isometric view of the modular fluid heater element of FIG. 1 with a first representative embodiment of a manifold at each end.

Referring now to FIG. 3, a single panel heater assembly 160 is shown. The heater assembly 160 is suitable for use by itself or as part of a pile in which multiple heater elements are stacked in a nested (or "un-nested") configuration. The heater assembly 160 includes a heater element 100 and first and second manifolds 120, i.e., headers, that provide an inlet and an outlet, respectively, of the heater element. In this regard, the first manifold 120 is positioned at the inlet end of the heater element 100 receives fluid to be heated from a source (not shown) and distributes the fluid to the inlet of each conduit 102 of the heater element 100. The second manifold 120 is positioned at the outlet end of the heater element 100 collects the heated fluid from the outlet of each conduit 102 and discharges the heated fluid. In the illustrated embodiment, the manifolds are the same, however, it will be appreciated that in some embodiments, the manifolds are differently configured.

Each manifold 120 includes an elongate hub 126 with a plurality of branches 124 extending laterally therefrom. In the illustrated embodiment, the hub 126 is a cylindrical tube extending perpendicular to the conduits 102 of the heating element 100, and each of the branches 124 corresponds to one of the conduits. The hub 126 includes an aperture 128 at one end to receive to be provided to the heater element 100 and to discharge heated fluid from the heater element.

In some embodiments, the diameter of the hub 126 and branches 124 is smaller than the diameter of the conduits 102 so that manifolds 120 of adjacent heater elements 100 do not interfere when multiple heater elements 100 are stacked in a nested configuration (as shown in FIG. 2). For such embodiments, the manifold 120 further includes an expander-reducer 122 is positioned between each branch 124 and the corresponding conduit 102 to provide a transition between the smaller diameter of the branch and the larger diameter of the conduits. When the manifold 120 is an inlet manifold providing fluid to the heating element 100, the expander-reducer 122 functions as an expander. When the manifold 120 is an outlet manifold receiving heated fluid to the heating element 100, the expander-reducer 122 functions as a reducer.

Figure 4:
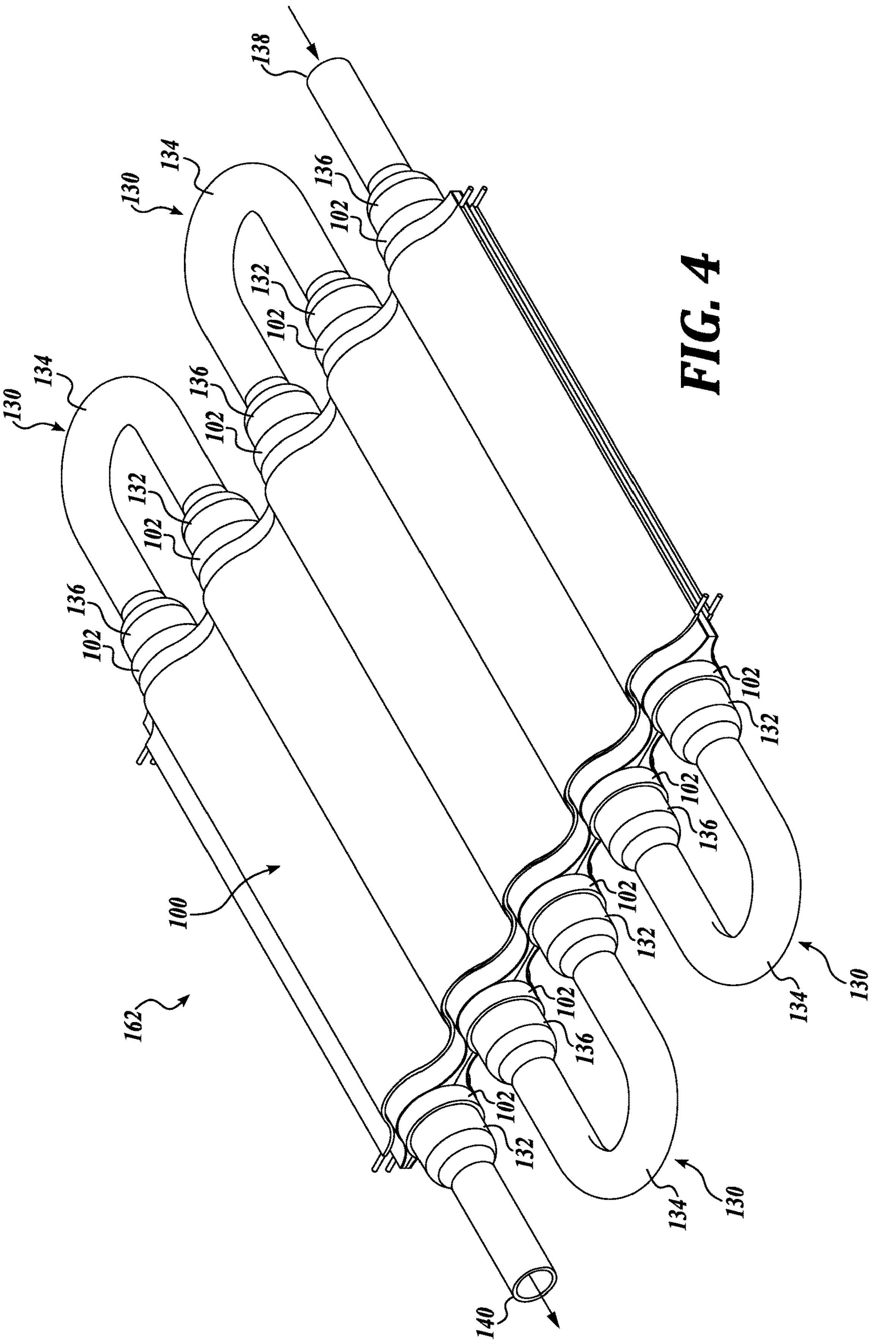
FIG. 4 shows an isometric view of the modular fluid heater element of FIG. 1 with a second representative embodiment of a manifold at each end.

Referring now to FIG. 4, another embodiment of a single panel heater assembly 162 is shown. The heater assembly 162 is suitable for use by itself or as part of a pile in which multiple heater elements are stacked in a nested (or "un-nested") configuration. The heater assembly 160 includes a heater element 100 and a plurality of end fittings 130 that route the fluid through the heater element along a serpentine path.

Each end fitting 130 includes a curved portion 134 that receives fluid from a conduit 102 of the heater element 100 and directs the fluid to an adjacent conduit of the heater element. An inlet 138 is positioned at one end of the heater element 100 to provide fluid to a first conduit 102, which is located at one end of the heater element. An outlet 140 is positioned an opposite end of the heater element 100 and provides a discharge path for the fluid from a conduit 102 located at an end of the heater element opposite the inlet 138. In the illustrated embodiment, the end fittings 130, inlet 138, and outlet 140 cooperate to define a single serpentine path through the heater element 100. In some embodiments, additional inlets 138 and outlets 140 are included to provide multiple serpentine paths through the heater element 100. For such embodiments, manifolds may be provided each end of the heater element 100 to provide and collect fluid to and from, respectively, the multiple fluid paths.

In some embodiments, the diameter of the curved portion 134 is smaller than the diameter of the conduits 102 so that end fittings 130 of adjacent heater elements 100 do not interfere when multiple heater elements 100 are stacked in a nested configuration (as shown in FIG. 2). For such embodiments, the end fittings 130 further includes a reducer 132 and an expander 136 positioned at opposite ends of the curved portion 134 to provide a transition between the smaller diameter of the curved portion and the larger diameter of the conduits. More specifically, the reducer 132 provides a transition between a discharge end of an associated conduit 102 and the curved portion 134, and the expander 136 provides a transition between the curved portion 134 and the inlet end of an adjacent conduit 102.

Figure 5:
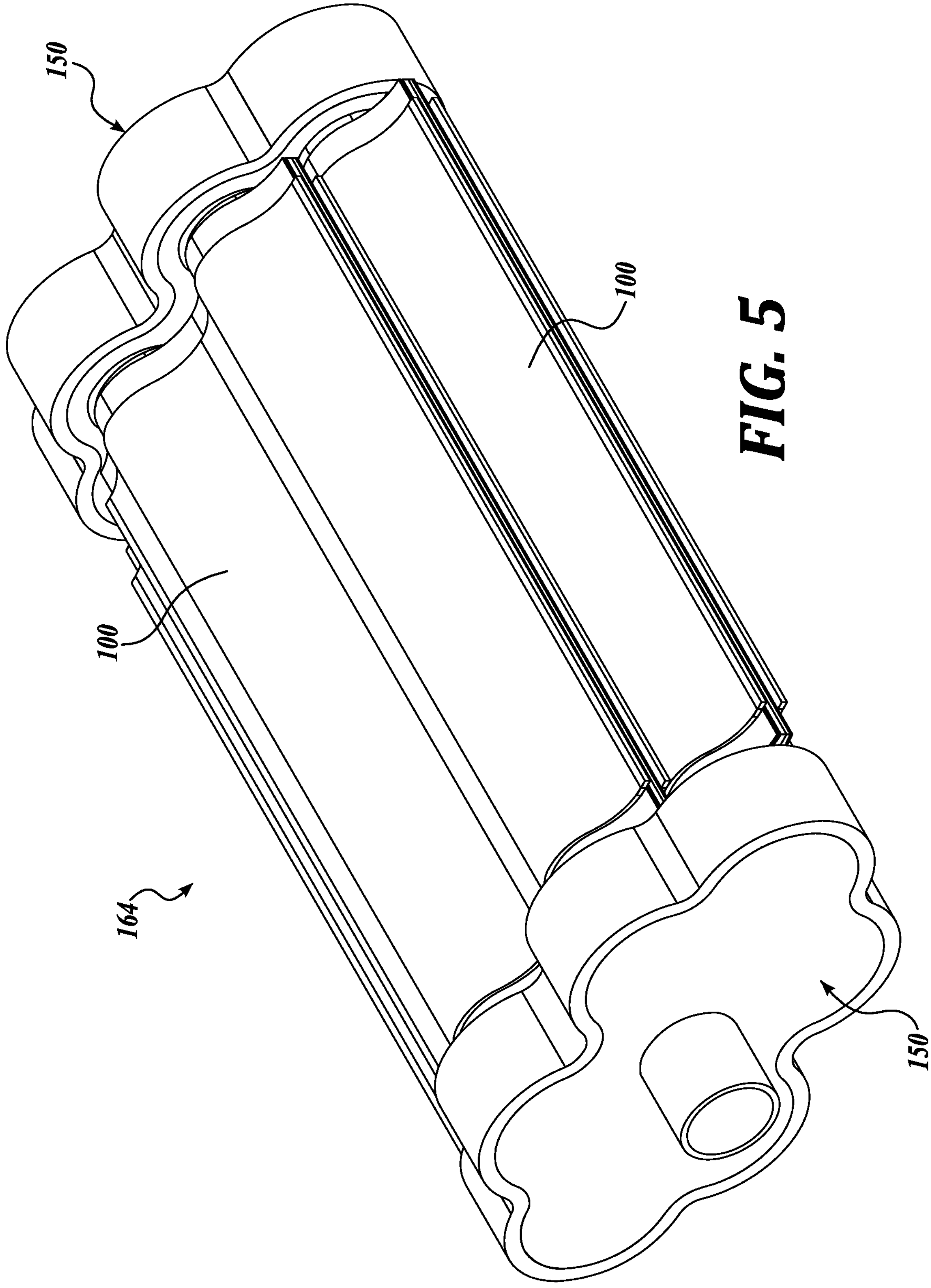
FIG. 5 shows an isometric view of a heater comprising a plurality of modular fluid heater elements similar to the modular fluid heater element shown in FIG. 1.
Figure 6:
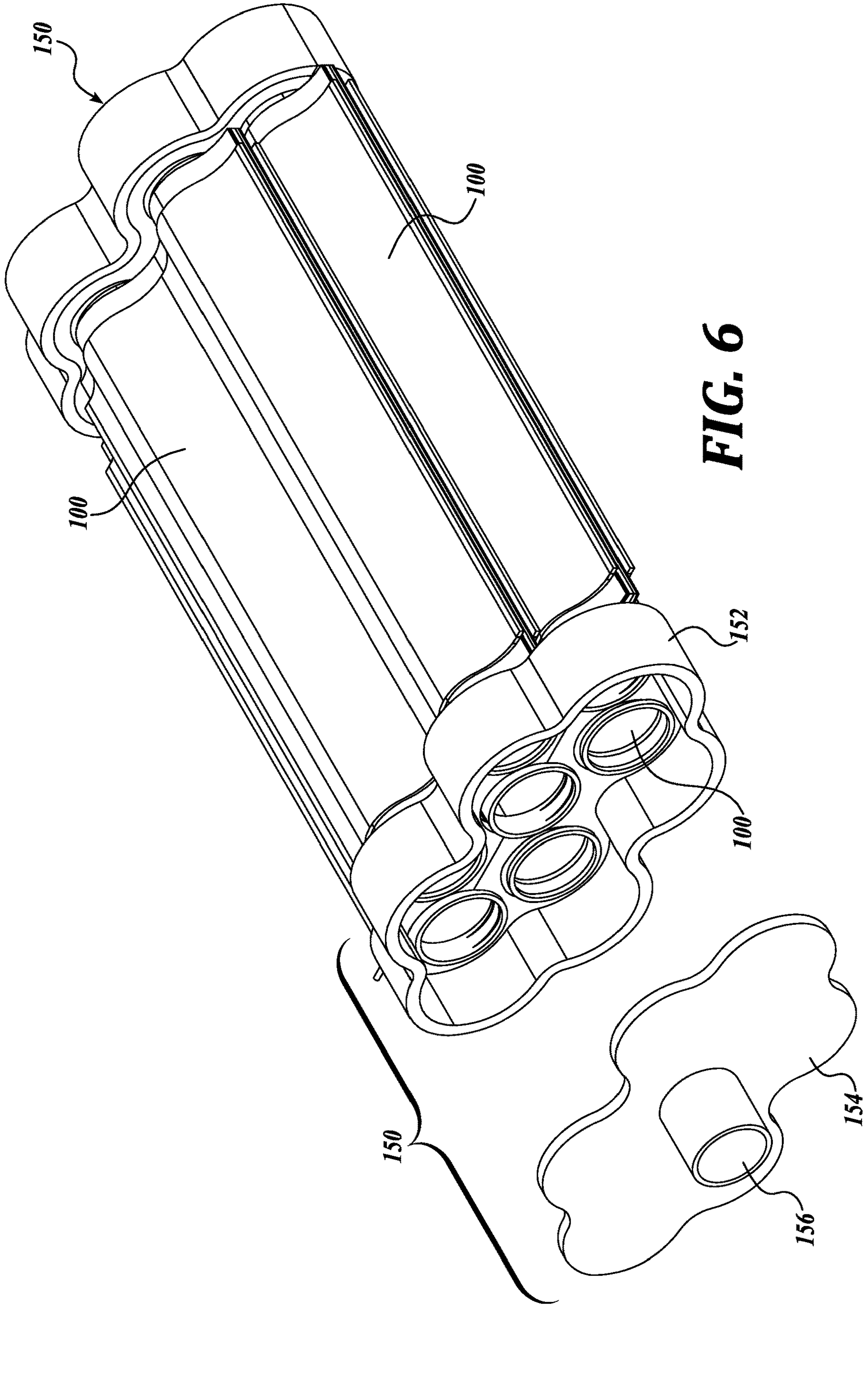
FIG. 6 shows a partially exploded isometric view thereof.

FIGS. 5 and 6 show an embodiment of a panel heater assembly 162 that includes a plurality of heater elements 100. In the illustrated embodiment, the heater assembly 162 includes three nested heater elements 100 wherein the number of conduits 102 in the heater elements varies. Embodiments are also contemplated in which the number of heater elements 100 and the number of conduits 102 in each heater element varies, and such embodiments should be considered within the scope of the present disclosure.

The panel heater assembly 162 includes a manifold 150 positioned at each end of the nested heater elements 100. A first manifold 150 acts as an inlet that provides fluid to the inlet of each of the heater elements 100, and a second manifold 150 collects fluid from the heater elements. As best shown in FIG. 6, each manifold 150 includes a housing 152 with base that acts as a frame to position the heater elements relative to each other. A side wall extends from the base and engages an end cap 154 so that the housing 152 and the end cap define a cavity in fluid communication with the conduits 102. An aperture 156 is formed in the end cap 154 to provide fluid to or discharge fluid from the manifold 150, depending upon whether the manifold is an inlet manifold or an outlet manifold.

Figure 7:
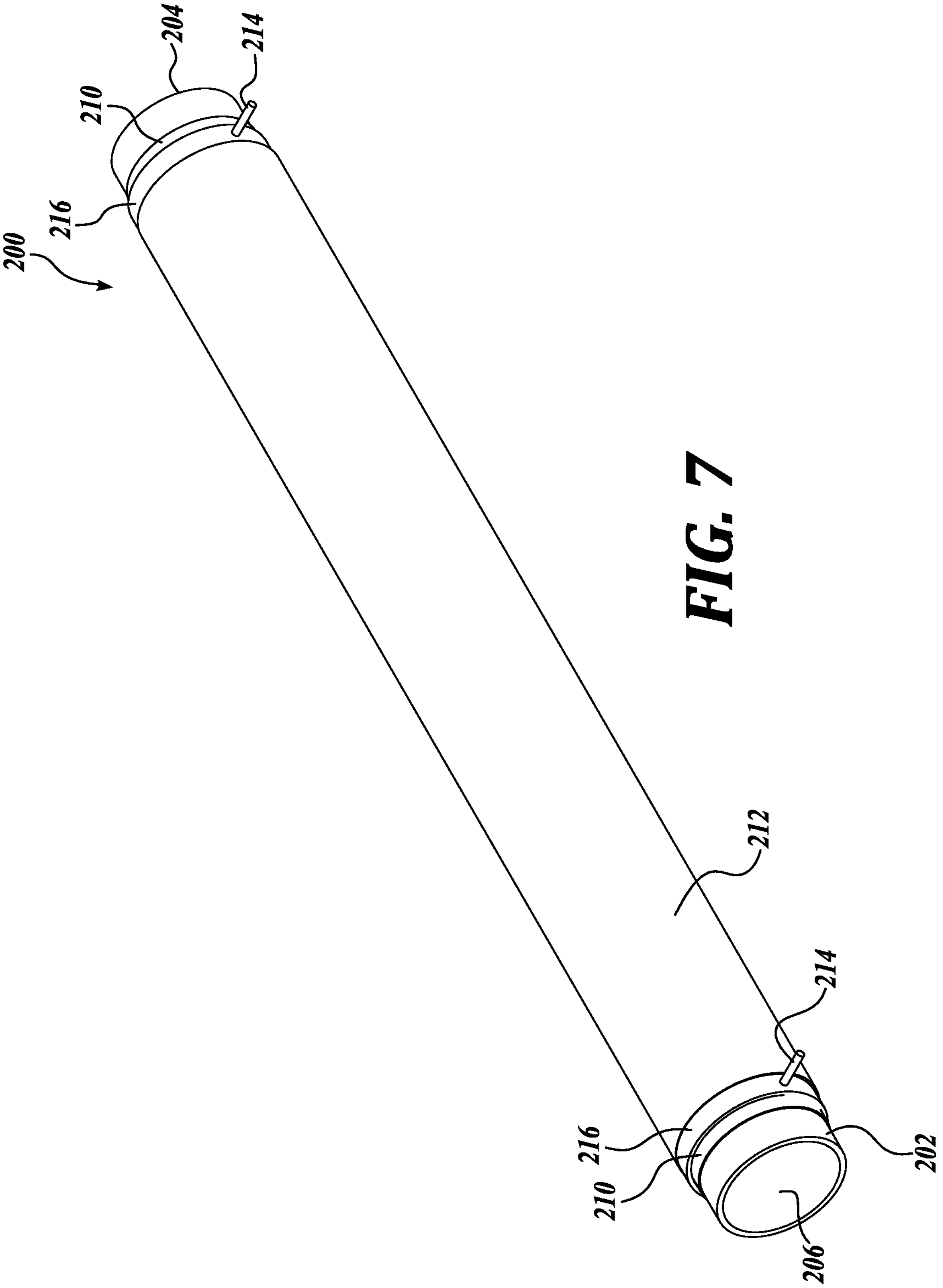
FIG. 7 shows an isometric view of a second representative embodiment of a modular fluid heater element.

FIG. 7 shows an embodiment of a modular heater element 200 that includes a single conduit 202. In the illustrated embodiment, the conduit 202 is an elongate cylinder with an inlet 204 configured to receive fluid and an outlet 206 configured to discharge heated fluid. The conduit 202 is formed from similar materials as the conduit 102 shown in FIG. 1. The heater element 200 includes and electrical insulation layer 210 applied to the conduit 202 and an electrothermal coating 212 applied to the electrical insulation later 210. The electrical insulation layer 210 and the electrothermal coating 212 are similar to the previously described insulation layer 110 and electrothermal coating 112, respectively. For the sake of brevity, these components will not be described again with the understanding that unless otherwise noted, they are similar to the corresponding parts of the previously described heater element 100.

A conductive ring 216, formed from copper foil or another suitable material, is positioned at each end of the heater element 200. An electrical lead 214 is mounted to each conductive ring 216 so that when the leads 214 are connected to a power sourced, an electric current flows across the electrothermal coating 112 from one ring the other. The flow of current generates heat, which is transferred by conduction through the insulation layer 210 and the conduit 202 to heat the fluid.

Figure 8:
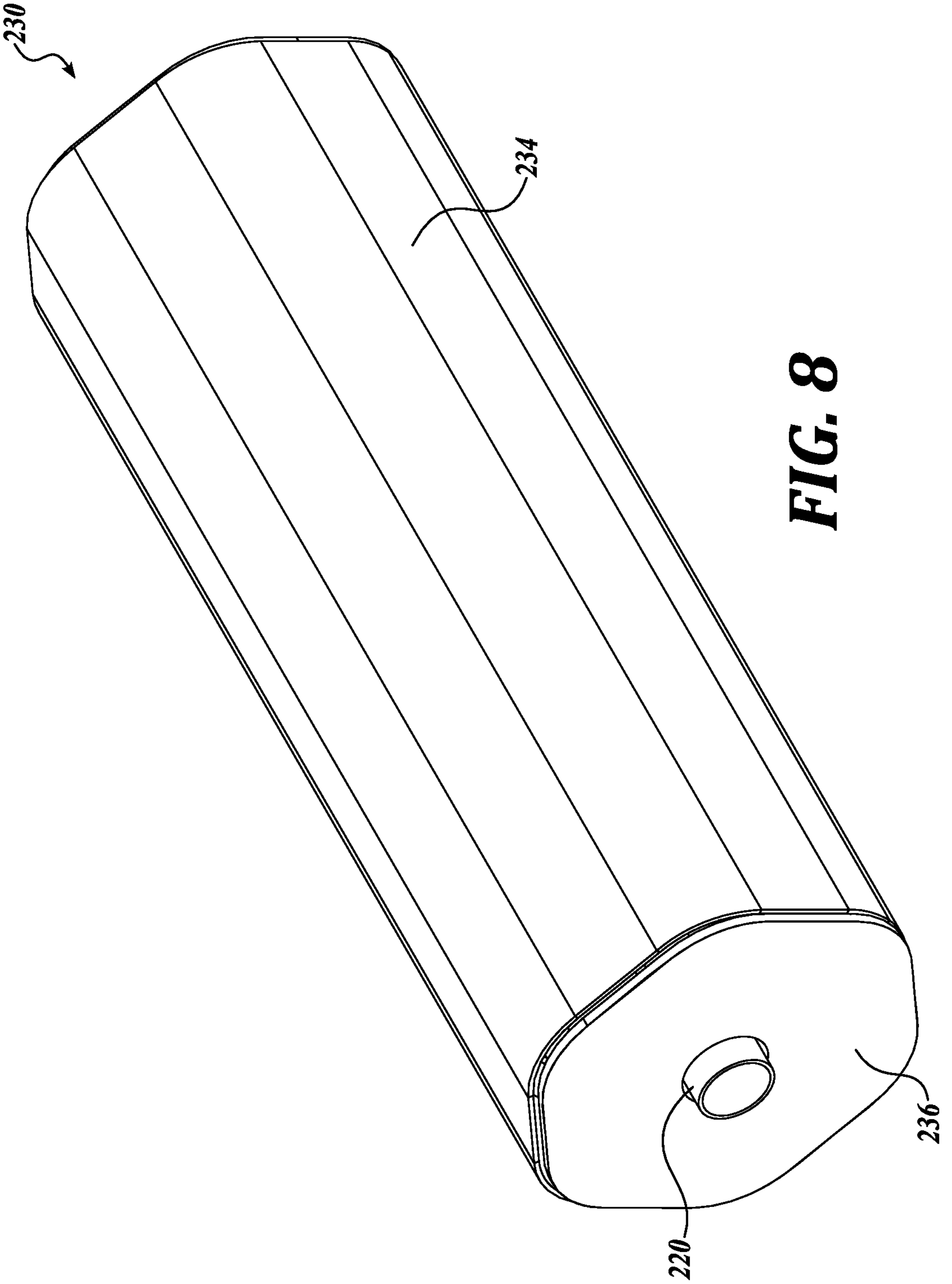
FIG. 8 shows an isometric view of a heater comprising a plurality of modular fluid heater elements as shown in FIG. 5.
Figure 9:
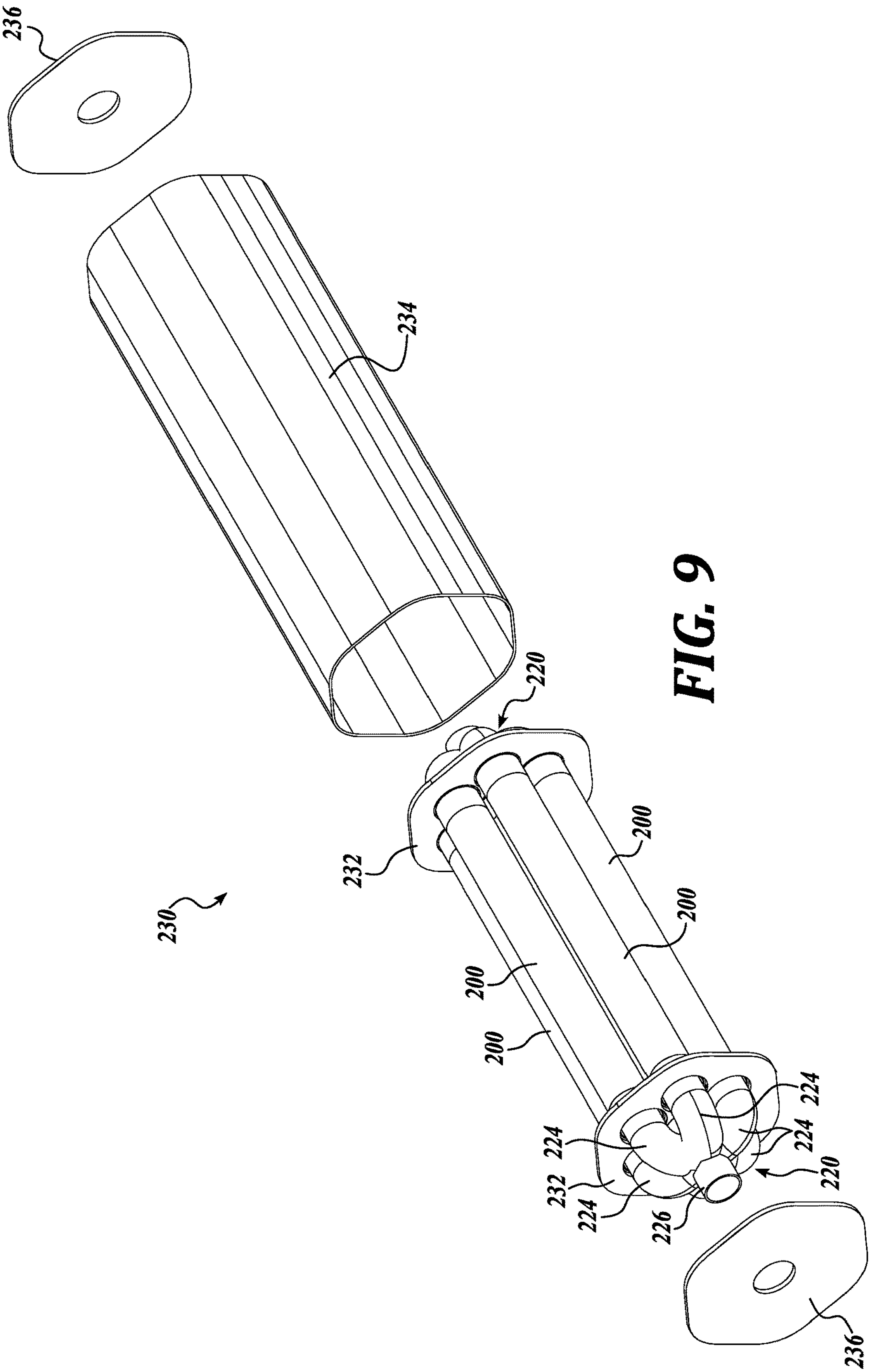
FIG. 9 shows a partially exploded isometric view thereof.

Referring now to FIGS. 8 and 9, a heater assembly 230 that uses modular heater element 200 is shown. The heater assembly 230 includes a housing 234, with an end plate 236 positioned at each end. As best shown in FIG. 9, a plurality of modular heater elements 200 are bundled within the housing 234 in a generally parallel orientation. A frame 232 at each end of the bundle engages the heater elements 200 to maintain the position of the heater elements relative to each other.

A manifold 220 is positioned at each end of the bundle of heater elements 200 and includes a hub 226 in fluid connection with a plurality of branches 224. Each branch 224 corresponds to one of the heater elements 200 and is configured to provide a fluid connection between the hub 226 and the conduit 202 of the corresponding heater element 200. In the illustrated embodiment, fluid enters the manifold 220 at one end of the heater assembly 230 and is distributed through the individual heater elements 200 to be heated. The heated fluid exits the heater elements 200 and is collected by the branches 224 of the second manifold 220 to be discharged from the hub 226.

Figure 10:
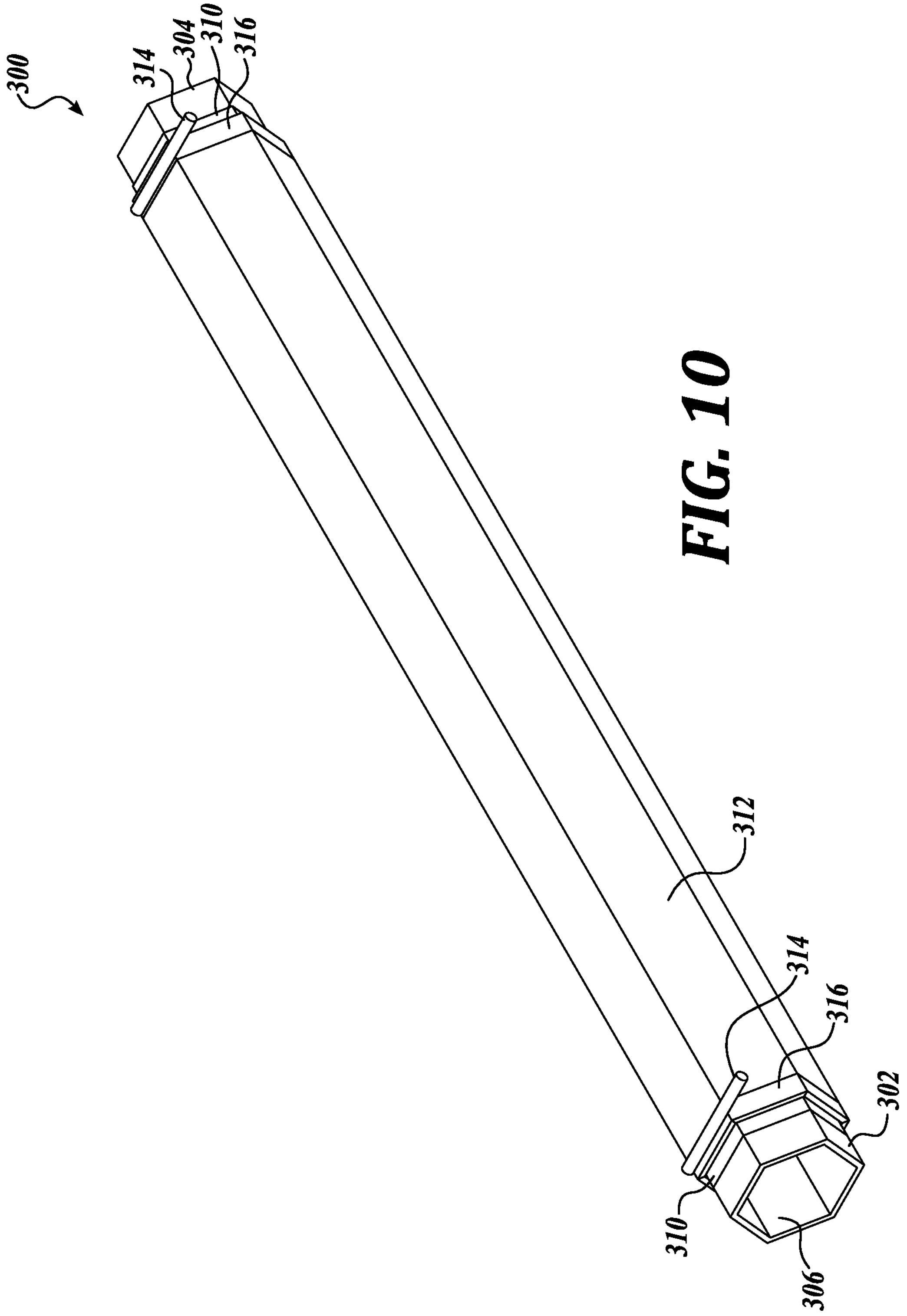
FIG. 10 shows an isometric view of a third representative embodiment of a modular fluid heater element.

FIG. 10 shows another embodiment of a modular fluid heater element 300. The heater element 300 is similar to the previously described heater element 200 shown in FIG. 7 except that the cross-sectional profile of the conduit 302 of heater element 300 is hexagonal instead of circular. The remaining components of heater element 300 are similar to the components of heater element 200, wherein components of heater element 300 having a reference number 3XX correspond to components of heater element 200 having a reference number 2XX, e.g., electrothermal coating 312 corresponds to electrothermal coating 212. While the cross-sectional profile of the conduit 302 and, therefore, the heater element 300, is hexagonal, it will be appreciated that any suitable profile may be used, including but not limited to: elliptical, triangular, square, octagonal, or any other profile.

Figure 11:
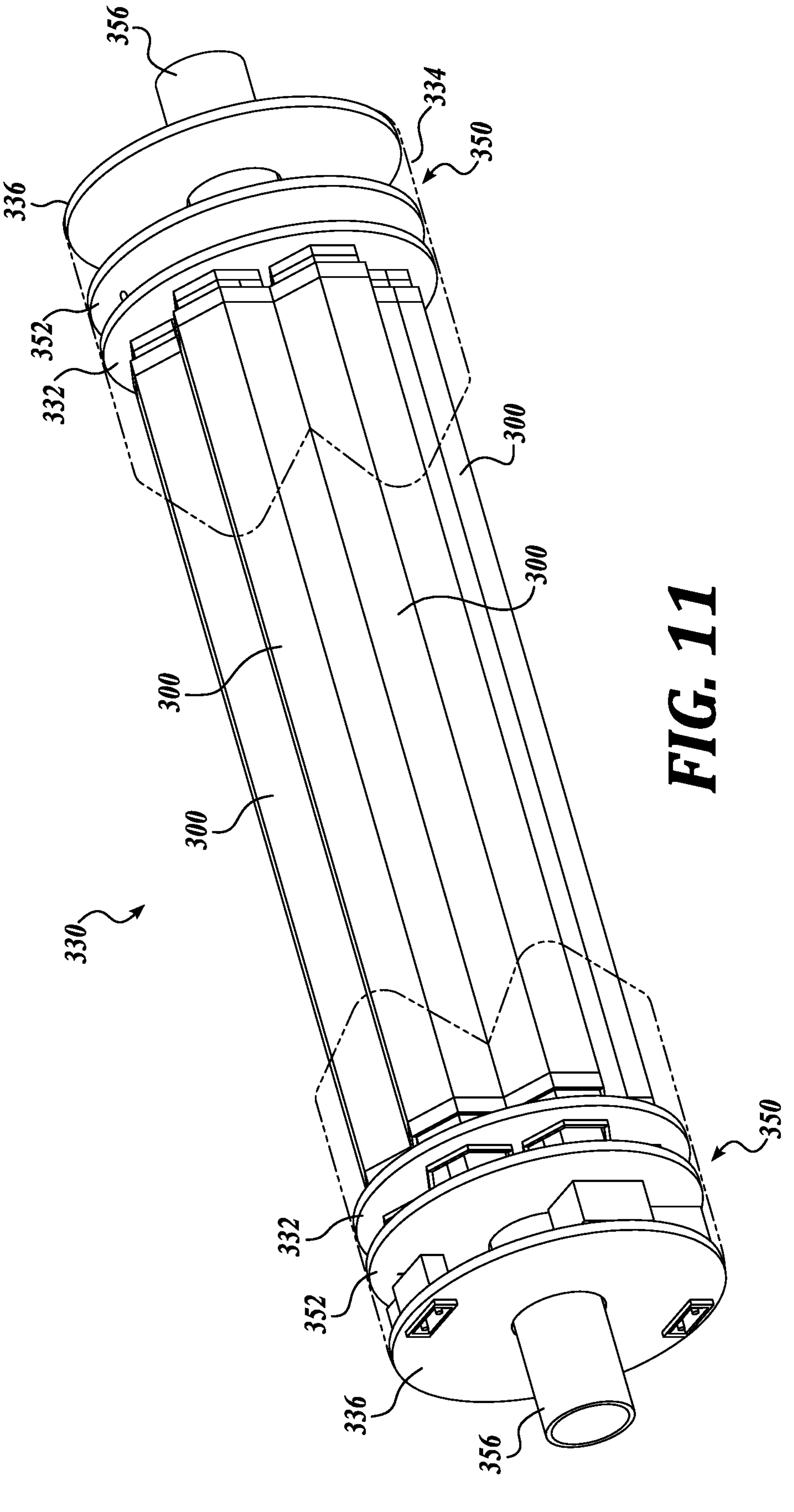
FIG. 11 shows an isometric view of a heater comprising a plurality of modular fluid heater elements as shown in FIG. 10, wherein an outer hosing is removed.

FIG. 11 shows an embodiment of a heater assembly 330 that utilizes a plurality of heater elements 300 shown in FIG. 10. The heater assembly 330 includes a plurality of hexagonal heater elements 300 arranged in a honeycomb pattern. The honeycomb pattern reduces or eliminates space between adjacent heater elements 300 so that heat lost to convection is reduced, and overall heater efficiency is increased.

A frame 332 is positioned at each end of the plurality of heater elements 300 and engages each heater element to maintain the position of the heater element relative to the other heater elements. A plate 352 is positioned parallel to each frame 332 and has a hub 356 coupled thereto. When the heater assembly 330 is assembled, the frames 332, the plates 352, the hubs 356, and the cover 334 cooperate to define a manifold 350 at each end. Similar to previously described manifolds, one of the illustrated manifolds 350 provides fluid to the heater elements 300 from a single source, and the other manifold discharges heated fluid collected from the heater elements.

The disclosed heater elements are lightweight, durable, and corrosion resistant, and provide uniform heating across a variety of surfaces and profiles. The electrical conductivity of the heater elements also provides static dissipation, averting undesirable electrostatic discharges. With applications in aerospace, refining, offshore oil piping and numerous commercial products.

Figure 12:
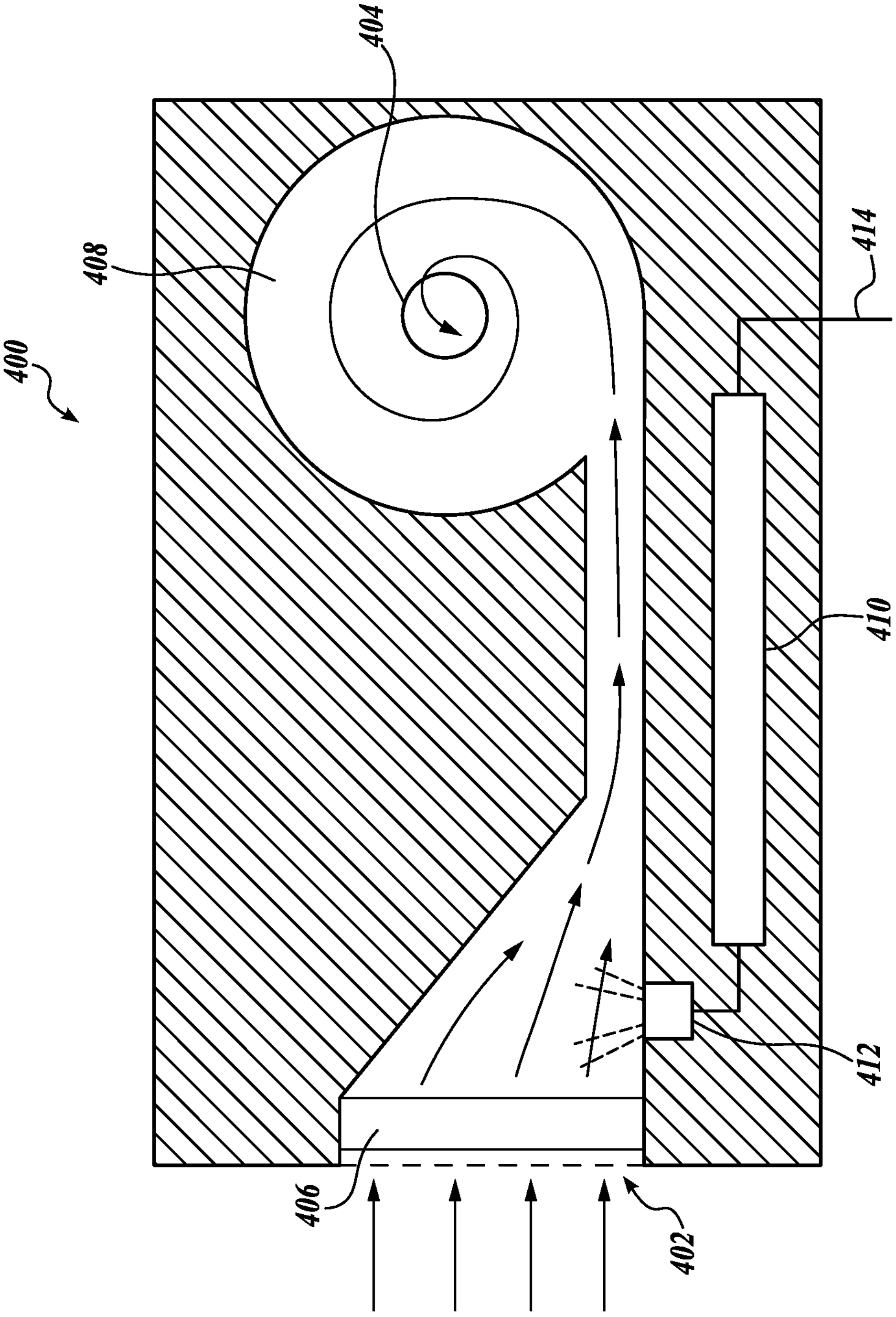
FIG. 12 shows a schematic view of an air humidifier that uses a heater comprising modular fluid heater elements.

One possible use for the disclosed heater elements and/or assemblies is illustrated in FIG. 12, which shows a schematic diagram of a humidifying unit. An exemplary embodiment of a humidifier is disclosed in U.S. Pat. No. 9,815,557, "Aircraft Humidifier," issued to Nelson et al. on Nov. 14, 2017, and currently assigned to Humbay Health, LLC, the disclosure of which is incorporated herein in its entirety.

Referring to FIG. 12, the humidifier 400 includes a fan 406 that draws ambient air in through an inlet 402. The air passes into a cyclone chamber 408, wherein the air is mixed with a mist of pressurized, atomized water that is injected into the chamber by a nozzle 412. The air/water vapor mixture is then discharged into the surrounding area through an outlet 404. A heater 410 heats water 414 received from a water source (not shown) and supplies the heated water to the nozzle 412 for injection into the cyclone chamber 408. The heated water promotes atomization and rapid evaporation of water mist droplets, which provides enhanced delivery of humidified air (air plus clear water vapor) to the aircraft cabin. The heaters described in the present disclosure are particularly suited for use in the humidifier by virtue of being lightweight, compact, and efficient.

Depending on the required application and the related fluid heating requirements, embodiments of disclosed heaters may include one or more modular heater elements (panel and/or tube) having any suitable length and channel cross-sectional profile and dimensions. The heater assemblies may include inlet and outlet manifolds or tubular headers, electrical wiring, temperature sensors and other components, such as pressure sensors and micro-controllers, encased with high-resistance value thermal insulation to divert the supplied thermal energy to the fluid flowing through the modular fluid heater elements. Fluids suitable for used with the disclosed heaters include water (up to and past the boiling point), oils, and other fluids. In some applications, air or gasses can be heated.

The disclosed heater elements and assemblies provide improved durability as compared to known heaters. In this regard, local degradation of electrical conduction paths is limited to nano-scale zones. When such degradation occurs, electrical current will be conducted in surrounding undamaged nano-coating material with insignificant loss of overall heat production. By comparison, known elastomeric pads with heating wires completely fail to heat if there is a break and/or burnout of the wire anywhere in the pad.

The heat-generating polymer coating of the embodiments of the present disclosure can be applied with basic shop skills as exists in remote locations. In contrast, fabricating NiChrome (or comparable heat-generating metals) requires metal working and welding skills. In addition, the metallic elements of the disclosed embodiments can be integrated into elements of an application's load-carrying structure thereby, offering weight reduction.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

In the foregoing description, specific details are set forth to provide a thorough understanding of exemplary embodiments of the present disclosure. It will be apparent to one skilled in the art, however, that the embodiments disclosed herein may be practiced without embodying all of the specific details. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A fluid heating element, comprising:

a first conduit comprising a first inlet and a first outlet, the first inlet being configured to receive a first portion of the fluid, the first outlet being configured to discharge the first portion of the fluid;

a second conduit comprising a second inlet and a second outlet, the second inlet being configured to receive a second portion of the fluid, the second outlet being configured to discharge the second portion of the fluid;

a web extending laterally between the first and second conduits;

an electrothermal coating associated with the first and second conduits; and an electrical lead configured to apply an electric current across the electrothermal coating, wherein the electrothermal coating converts the electric current to heat that is transferred to the first and second conduits to the fluid.

2. The fluid heating element of claim 1, further comprising an electric insulator applied to the first and second conduits between the first and second conduits and the electrothermal coating.

3. The fluid heating element of claim 1, wherein the electrothermal coating comprises a polymeric coating that generates heat in response to the applied current.

4. The fluid heating element of claim 3, wherein the electrothermal coating comprises a high-temperature resistive polymer infused with conductive particles.

5. The fluid heating element of claim 1, further comprising a first manifold comprising a manifold inlet in fluid communication with the first and second inlets.

6. The fluid heating element of claim 5, further comprising a second manifold comprising a manifold outlet in fluid communication with the first and second outlets.

7. The fluid heating element of claim 1, wherein the first outlet is positioned proximate to the second inlet, the fluid heating element further comprising an end fitting in fluid connection with the first outlet and the second inlet, wherein the first conduit, the second conduit, and the end fitting cooperate to define at least part of a serpentine path.

8. The fluid heating element of claim 1, wherein the web is integrally formed with the first and second conduits.

9. A fluid heater, comprising a first heating element according to claim 1 and a second heating element according to claim 1, wherein each of the first and second heating elements having a thickness, the first and second heating elements being arranged in a nested configuration, wherein a total thickness of the nested first and second heating elements is less than the sum of the thickness of the first heating element and the thickness of the second heating element.

10. The fluid heater of claim 9, wherein a first conduit of the first heating element is at least partially disposed between the first and second conduits of the second heating element.

11. The fluid heater of claim 9, further comprising a first manifold comprising a manifold inlet in fluid communication with the first and second inlets of each of the first and second heating elements.

12. The fluid heater of claim 11, further comprising a second manifold comprising a manifold outlet in fluid communication with the first and second outlets of each of the first and second heating elements.

13. A fluid heater, comprising a plurality of fluid heating elements, each of the plurality of fluid heating elements including:

a first conduit comprising a first inlet and a first outlet, the first inlet being configured to receive a first portion of the fluid, the first outlet being configured to discharge the first portion of the fluid;

a second conduit comprising a second inlet and a second outlet, the second inlet being configured to receive a second portion of the fluid, the second outlet being configured to discharge the second portion of the fluid;

an electrothermal coating associated with the first and second conduits; and an electrical lead configured to apply an electric current across the electrothermal coating, wherein the electrothermal coating converts the electric current to heat that is transferred to the first and second conduits to the fluid, wherein each of the first and second conduits of each of the plurality of heating elements has a circular cross-section, and the plurality of heating elements is arranged in a cylindrical configuration.

14. A fluid heater, comprising a plurality of fluid heating elements, each of the plurality of fluid heating elements including:

a first conduit comprising a first inlet and a first outlet, the first inlet being configured to receive a first portion of the fluid, the first outlet being configured to discharge the first portion of the fluid;

a second conduit comprising a second inlet and a second outlet, the second inlet being configured to receive a second portion of the fluid, the second outlet being configured to discharge the second portion of the fluid;

an electrothermal coating associated with the first and second conduits; and an electrical lead configured to apply an electric current across the electrothermal coating, wherein the electrothermal coating converts the electric current to heat that is transferred to the first and second conduits to the fluid, wherein each of the first and second conduits of each of the plurality of heating elements has a hexagonal cross-section, and the plurality of heating elements is arranged in a honeycomb pattern.

15. A humidifier, comprising:

a fan configured to draw air into a humidifier inlet;

a cyclone chamber that directs the air along a cyclonic path prior to being discharged from a humidifier outlet;

a fluid heating element having:

a first conduit comprising a first inlet and a first outlet, the first inlet being configured to receive a first portion of the fluid, the first outlet being configured to discharge the first portion of the fluid;

a second conduit comprising a second inlet and a second outlet, the second inlet being configured to receive a second portion of the fluid, the second outlet being configured to discharge the second portion of the fluid;

an electrothermal coating associated with the first and second conduits; and an electrical lead configured to apply an electric current across the electrothermal coating, wherein the electrothermal coating converts the electric current to heat that is transferred to the first and second conduits to the fluid; and a nozzle configured to discharge heated water received from the fluid heating element into the cyclone chamber.

* * * * *